United States Patent [19]

Marijnissen et al.

[11] Patent Number: 5,193,736

[45] Date of Patent: Mar. 16, 1993

[54] METHOD FOR REPAIRING TURBINE VANES

[75] Inventors: Gillion H. Marijnissen, NC Beringe, Netherlands; Timothy P. Vastine, North Richland Hills; Gerald T. Smith, Arlington, both of Tex.

[73] Assignee: Interturbine Corporation, Grand Prairie, Tex.

[21] Appl. No.: 662,743

[22] Filed: Mar. 1, 1991

[51] Int. Cl.$^5$ ............................................. B23P 15/02
[52] U.S. Cl. ................................... 228/119; 228/175; 228/246; 29/402.13; 29/889.1
[58] Field of Search ............... 228/119, 246, 247, 254, 228/173.5, 175; 29/402.11, 402.09, 402.13, 402.16, 889.1; 416/230 A, 230 R

[56] References Cited

U.S. PATENT DOCUMENTS

| | | | |
|---|---|---|---|
| 3,006,065 | 10/1961 | Watson | 228/119 |
| 3,219,123 | 11/1965 | Stöcker | 416/230 A |
| 3,885,291 | 5/1975 | DiChiara | 29/402.11 |
| 3,909,157 | 9/1975 | Wachtell, et al. | 415/217 |
| 3,920,947 | 11/1975 | Wachtell, et al. | 219/69 M |
| 3,963,894 | 6/1976 | Wachtell, et al. | 219/69 E |
| 3,967,353 | 7/1976 | Pagnotta et al. | 228/189 |
| 3,986,784 | 10/1976 | Eftefield | 228/189 |
| 4,118,147 | 10/1978 | Ellis | 416/230 |
| 4,141,127 | 2/1979 | Cretella et al. | 29/889.1 |
| 4,188,811 | 2/1980 | Brimm | 72/63 |
| 4,291,448 | 9/1981 | Cretella et al. | 29/156.8 B |
| 4,316,700 | 2/1982 | Schramm | 228/230 A |
| 4,478,425 | 10/1984 | Benko | 29/402.13 |
| 4,480,956 | 11/1984 | Krüger et al. | 416/97 A |
| 4,611,744 | 9/1986 | Fraser et al. | 228/119 |
| 4,657,171 | 4/1987 | Robins | 228/119 |
| 4,709,461 | 12/1987 | Freeman, Jr. | 29/526.3 |
| 4,779,848 | 10/1988 | Brimm et al. | 266/259 |
| 4,789,140 | 12/1988 | Lirones | 266/238 |
| 4,790,847 | 12/1988 | Lirones | 75/93 R |
| 4,811,584 | 3/1989 | Brimm et al. | 72/63 |
| 4,832,252 | 5/1989 | Fraser | 228/119 |
| 4,837,389 | 6/1989 | Shankar et al. | 428/668 |
| 4,842,183 | 6/1989 | Antony et al. | 228/119 |
| 4,844,322 | 7/1989 | Flowers et al. | 228/119 |
| 4,866,828 | 9/1989 | Fraser | 29/156.8 B |
| 4,896,408 | 1/1990 | Fraser | 29/156.8 B |
| 4,935,277 | 6/1990 | Le Balc'h | 416/230 |
| 4,951,390 | 8/1990 | Fraser et al. | 29/889.1 |
| 4,953,777 | 9/1990 | Griffith et al. | 228/119 |
| 4,965,095 | 10/1990 | Baldi | 427/142 |

*Primary Examiner*—Richard K. Seidel
*Assistant Examiner*—Jeanne M. Elpel
*Attorney, Agent, or Firm*—Testa, Hurwitz & Thibeault

[57] ABSTRACT

The present invention discloses a method for repairing metal edges using wire and a braze alloy. Using this method, it is possible to restore a damaged metal edge to blueprint dimensions. In the preferred embodiment, the disclosed method relates to the restoration of damaged or worn turbine vanes. The method comprises a preparation step of cleaning and milling the edge of the base metal to be repaired. A repair wire is then placed along the edge, and a braze compound is applied to the junction of the base metal and the repair wire. A brazing step follows which integrates the base metal, the wire and the brazing compound. After standard finishing steps, the repaired vane meets blueprint specifications and is ready for use in a turbine.

16 Claims, 2 Drawing Sheets

METHOD FOR REPAIRING TURBINE VANES

FIELD OF THE INVENTION

This invention relates to the repair of damaged or worn edges in turbine vanes.

BACKGROUND OF THE INVENTION

The edges of metal objects are subject to deterioration resulting from use. Turbine components, for instance, deteriorate from friction due to normal movement, as well as wear, erosion and corrosion from use in the fluid medium. In particular, very expensive jet engine turbine vanes experience erosion wear on their leading and trailing edges during operation. This progressive deterioration of the vanes reduces the efficiency of the turbine. Eventually, the vane chord width and vane thickness are reduced below the minimum allowable serviceable limits, resulting in mandatory disposal or repair of the excessively worn vane.

To preclude disposal of such expensive vanes, various repair methods have been devised with their object being the restoration of the vanes to serviceable dimensions. Small vane irregularities are typically blended out by filing or sanding. If the vane is bent, a more complex process of major reshaping by the application of a mechanical force and heat to the metal is used. Small cracks are often welded, and various braze alloys have been used to fill surface irregularities and to build up surface dimensions. None of the prior art methods, however, disclose a technique for restoring the trailing edge of a turbine vane to blueprint dimensions when it is worn beyond specified limits without the introduction of a significant thermally induced stress gradient, such as that resulting from an electron beam weld repair.

SUMMARY

The principal object of this invention is a repair technique for damaged or worn turbine vanes using repair wire and a powder braze alloy mixture to restore vanes to blueprint dimensions. One feature of the invention is a method for repairing an edge of a base material including: (a) preparing an edge of the material to be repaired; (b) placing a repair wire in close proximity to the edge to be repaired; (c) applying a braze compound to the junction of the metal base and the repair wire; and (d) brazing with a braze compound so as to join the repair wire and the base material.

Another feature of the invention is a method for repairing a damaged turbine vane including: (a) cleaning the vane, including the removal of coatings, so as to expose base metal; (b) milling the damaged edge of the base metal to be repaired to form a suitable seat for accepting a length of wire comparable to that of the milled edge; (c) placing wire of sufficient diameter to act as a dam or support for a brazing compound against the milled edge; (d) tack welding the wire to the edge to be repaired; (e) cleaning the vane; (f) applying sufficient amount of a braze compound to cover the wire, vane and mated area so as to exceed desired dimensions; (g) vacuum furnace brazing including the performing of a diffusion cycle; and (h) refinishing, using standard methods to obtain predetermined dimensions.

DESCRIPTION OF THE DRAWINGS

Other features and benefits of the invention can be more clearly understood with reference to the specification and the accompanying drawings in which.

DESCRIPTION OF THE PREFERRED EMBODIMENT

Figure 1:
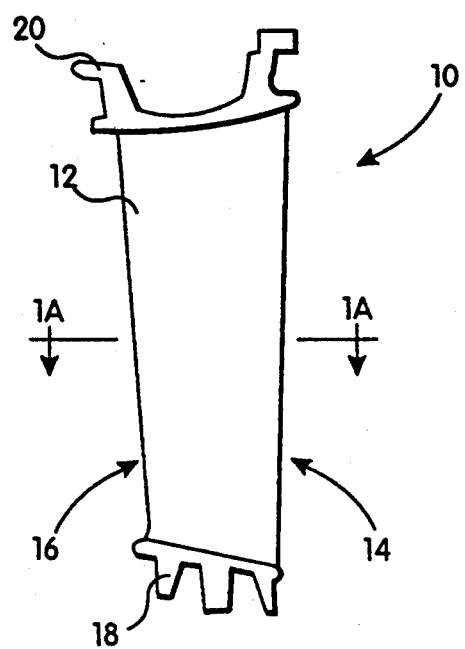
FIG. 1 is a plan view of an undamaged turbine vane assembly.
Figure 1A:
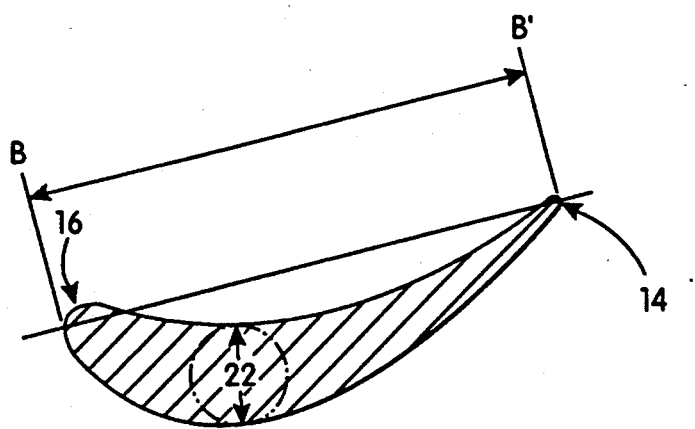
FIG. 1(A) is a representative cross-sectional view of the turbine vane assembly of FIG. 1 taken along line A—A' of FIG. 1.

With reference now to FIG. 1, a turbine vane assembly 10 is shown with a turbine vane 12, having a trailing edge 14 and a leading edge 16, attached to an inner foot 18 and an outer foot 20 which serve to anchor the vane 12 in position within the turbine. The line A—A' represents a cross-section through the vane 12. Referring also to FIG. 1(A), the cross-section of the vane 12 indicated by line A—A' in FIG. 1 is shown, with the vane chord width at this location being represented by the line B—B'. The leading edge 16, the trailing edge 14, and vane thickness 22 are typical wear areas in the vane 12.

Figure 2:
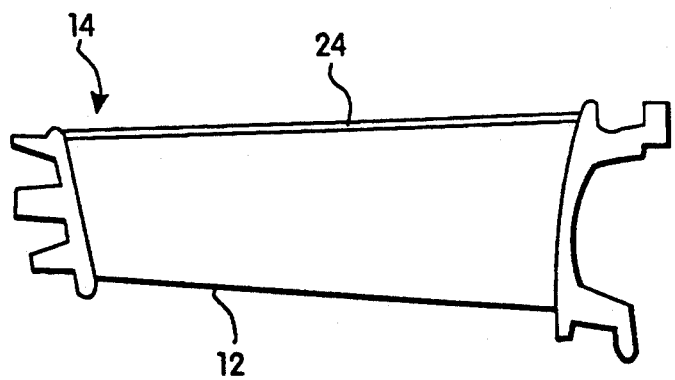
FIG. 2 is a plan view of a damaged vane showing the placement of a repair wire used in performing wire repair.
Figure 2A:
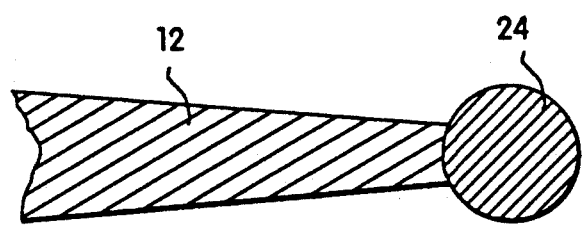
FIG. 2(A) is a cross-sectional view of the trailing edge of the vane shown in FIG. 2.

Referring to FIG. 2, in the preferred embodiment, for example to repair the trailing edge 14, any coatings on the vane 12 are removed prior to a visual inspection to ensure the vane is a suitable candidate for repair. The point of maximum chord width is then determined along the trailing edge 14 of the vane. The trailing edge 14 is then milled back to accept a repair wire 24 Typically no more than 0.015 inches will be removed to accept repair wires 24 of varying diameter. The vane is then cleaned by a silicon carbide grit or other suitable blast media.

It is envisaged that the vane 12 can be milled back either more or less than 0.015 inch, and that other diameters of repair wire 24 be used. One purpose of the wire 24 is to act as a support or dam for the braze compound 26 that will later be applied to the vane 12 and wire 24 combination. It is also envisaged that the vane 12 can be cleaned by other mechanical or chemical means.

The vane 12 with a damaged trailing edge 14 is shown in FIG. 2 with repair wire 24 anchored in position adjacent to the edge 14 to be repaired. In one embodiment, a super alloy, Aerospace Material Specification (AMS) 5391, is the base metal of the turbine vane 12 subject to repair. A section of metallurgically compatible weld wire 24, here AMS 5837, is cut to match the entire trailing edge 14 of the vane 12. The weld wire 24 is tack welded along the trailing edge 14 with three tack welds, one at each end and one in the center of the vane 12. To optimize the later brazing step, a maximum of 0.010 inch gap is allowed between wire 24 and trailing edge 14. The welding is performed in a dry box weld chamber filled with an argon.

It is envisaged that weld wires other than AMS 5837 may be used, and also that they may be employed as single or multiple pieces. It is further envisaged that wire 24 be juxtaposed with the vane 12 by other means than tack welding, such as physical holding or gluing.

Figure 2B:
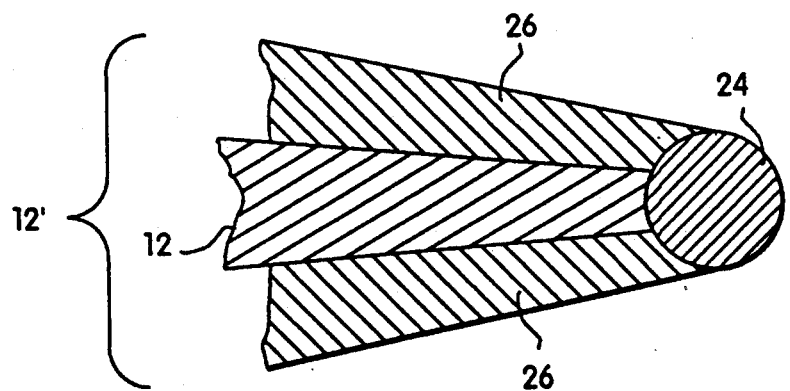
FIG. 2(B) is a cross-sectional view of the trailing edge of the vane shown in FIG. 2 after application of the braze alloy.

Referring now to FIG. 2(B), the built-up vane 12' is shown in cross-section with wire 24 in place. Braze compound 26, a material developed to be compatible with base material 12, wire 24, and protective coating 28, has been applied in sufficient quantity to cover the joined area, the wire 24 and a portion of the vane 12. The braze compound material 26 is applied in sufficient thickness to allow for blending and to achieve the required dimensions after brazing.

In the preferred embodiment, the vane 12 with wire 24 and braze compound 26 in place are then vacuum furnace brazed, and subjected to a diffusion cycle. The brazing and diffusion are performed in a vacuum furnace evacuated to a level of better than $5 \times 10^{-4}$ Torr. The vane 12' is heated to 2200° F. (1205° C.) at 50° F. (25° C.) per minute; and held at 2200° F. (1205° C.) for 30 minutes. A vacuum furnace cooling follows to 1700° F. (927° C.). This in turn is followed by a gas fan cooling with argon to below 600° F. (315° C.). The vacuum furnace is again evacuated to a level of better than $5 \times 10^{-4}$ Torr. The vane 12' is then heated to 2150° F. (1177° C.) at 50° F. (25° C.) per minute; and held at 2150° F. (1177° C.) for four hours. This in turn is followed by a gas fan cooling with argon to below 200° F. (93° C.). The vane 10' is then belt sanded and hand blended to meet the predetermined dimensions and to achieve proper vane contour and surface finish. It is envisaged that other methods can be used to perform the finishing steps.

Figure 2C:
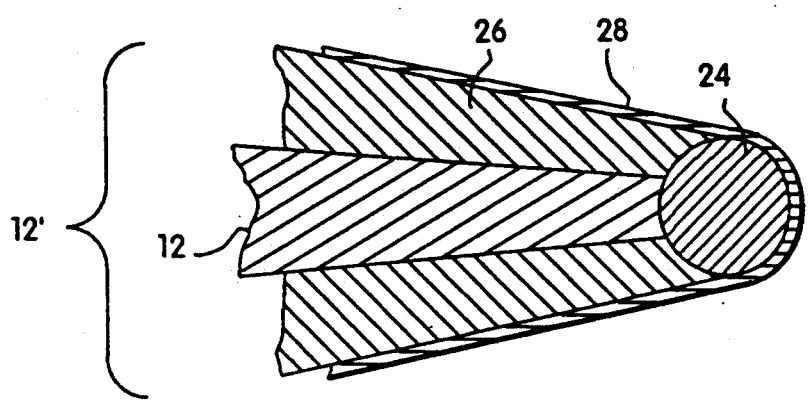
FIG. 2(C) is a cross-sectional view of the vane of FIG. 2(B) after completion of wire repair.

Referring to FIG. 2(C) a sectional view of the vane 12' at the completion of wire repair is shown. The original vane 12, having been worn to below design specification, has been built-up with wire 24, braze 26, and protective coating 28.

These and other examples of the concept of the invention illustrated above are intended by way of example and the actual scope of the invention is to be determined solely from the following claims.

I claim:
1. A method for repairing a trailing edge of a damaged jet engine turbine vane comprising the steps of:
   (a) cleaning said vane, including removing coatings, so as to expose a base metal of said vane,
   (b) milling said trailing edge of said vane to be repaired to form a milled edge having a suitable seat for accepting a length of wire of comparable length to that of said milled edge;
   (c) positioning said length of wire against said milled edge to form a mated area, wherein said length of wire is of sufficient diameter to act as a dam or support for a brazing compound;
   (d) tack welding said length of wire to said milled edge;
   (e) cleaning said vane;
   (f) applying sufficient amount of said brazing compound along substantially the entire length of said vane adjacent said length of wire to cover at least a portion of said length of wire, said vane and said mated area to exceed desired dimensions;
   (g) vacuum furnace brazing said vane treated in accordance with preceding steps (a) through (f);
   (h) performing a diffusion cycle; and
   (i) refinishing said vane to obtain predetermined dimensions.

2. A process for restoring desired dimensions and a nominal shape to a metallic object of a known material composition, having at least one deteriorated edge and deteriorated edge regions proximate thereto, wherein said deteriorated edge is defined by an intersection of a first and second two-dimensional surface, comprising:
   positioning repair wire, having a length which is substantially equivalent to a length of said deteriorated edge, in parallel juxtaposition to said deteriorated edge;
   applying a braze compound along substantially an entire length of said first two dimensional surface and adjacent said repair wire, wherein a sufficient amount of said braze compound is applied to said first surface, said repair wire and said deteriorated edge regions proximate thereto to enable restoration of said nominal shape of said metallic object;
   applying said braze compound along an entire length of said second two-dimensional surface and adjacent said repair wire, wherein a sufficient amount of said braze compound is applied to said second surface, said repair wire and said deteriorated edge regions proximate thereto to enable restoration of said nominal shape of said metallic object;
   heating said metallic object, said braze compound and said repair wire to cause substantial material integration of said metallic object; said braze compound and said repair wire; and
   refinishing said metallic object to obtain said nominal shape and desired surface characteristics.

3. The process of claim 2, wherein said first and said second two-dimensional surfaces are planar.

4. The process of claim 2, wherein said first and said second two-dimensional surfaces are curved.

5. The process of claim 2, wherein said first two-dimensional surface is planar and aid second two-dimensional surface is curved.

6. The process of claim 2, wherein said heating is in a furnace.

7. The process of claim 6, wherein said furnace is a vacuum furnace.

8. The process of claim 2, wherein said metallic object is a jet engine turbine vane, said turbine vane having a leading edge and a trailing edge with respect to said vane's orientation within an air stream through said jet engine under normal operating conditions.

9. The process of claim 8, wherein said deteriorated edge is said trailing edge of said jet engine turbine vane.

10. The process of claim 8, wherein said jet engine turbine vane comprises a super alloy and wherein said braze compound comprises a mixture of nickel based alloys.

11. The process of claim 2, wherein said braze compound comprises alloy powders having material characteristics similar to said known material composition of said metallic object.

12. The process of claim 2, wherein said repair wire comprises a single, nominally cylindrical, metallic segment.

13. The process of claim 2, wherein said repair wire comprises a plurality of wires.

14. The process of claim 2, wherein said repair wire has a diameter sufficient to act as a dam or support for said braze compound.

15. The process of claim 2, wherein said deteriorated edge results from gradual erosion due to corrosion.

16. The process of claim 2, wherein said deteriorated edge results from non-recursive physical impact.

* * * * *